US009763249B2

(12) United States Patent
Lee et al.

(10) Patent No.: US 9,763,249 B2
(45) Date of Patent: Sep. 12, 2017

(54) METHOD AND APPARATUS FOR ALLOCATING RESOURCE IN HETEROGENEOUS NETWORK

(71) Applicant: ELECTRONICS AND TELECOMMUNICATIONS RESEARCH INSTITUTE, Daejeon (KR)

(72) Inventors: Namsuk Lee, Daejeon (KR); Yong Seouk Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 91 days.

(21) Appl. No.: 14/686,740

(22) Filed: Apr. 14, 2015

(65) Prior Publication Data
US 2015/0373712 A1    Dec. 24, 2015

(30) Foreign Application Priority Data

Jun. 18, 2014  (KR) .......................... 10-2014-0074529

(51) Int. Cl.
*H04W 72/04* (2009.01)
*H04W 28/16* (2009.01)

(52) U.S. Cl.
CPC ....... *H04W 72/0453* (2013.01); *H04W 28/16* (2013.01)

(58) Field of Classification Search
CPC .............................................. H04W 72/0453
See application file for complete search history.

(56) References Cited

U.S. PATENT DOCUMENTS

| 2011/0013568 A1 | 1/2011 | Yim et al. | |
| 2011/0081914 A1* | 4/2011 | Lin | H04W 16/10 455/450 |
| 2011/0134825 A1* | 6/2011 | Kim | H04L 5/0007 370/312 |
| 2013/0259022 A1* | 10/2013 | Jitsukawa | H04W 72/1273 370/342 |
| 2013/0260786 A1 | 10/2013 | Song et al. | |
| 2014/0031050 A1* | 1/2014 | Boudreau | H04W 72/1231 455/452.1 |
| 2014/0064201 A1* | 3/2014 | Zhu | H04L 5/0094 370/329 |
| 2015/0327287 A1* | 11/2015 | Kim | H04W 72/121 370/329 |
| 2016/0323078 A1* | 11/2016 | Takeda | H04J 11/0053 |

FOREIGN PATENT DOCUMENTS

| KR | 2010-0032725 A | 3/2010 |
| KR | 2011-0029727 A | 3/2011 |
| KR | 2013-0042673 A | 4/2013 |

* cited by examiner

Primary Examiner — Jason Mattis
(74) Attorney, Agent, or Firm — Rabin & Berdo, P.C.

(57) ABSTRACT

A method and apparatus for allocating a resource in a heterogeneous network environment are provided. In a heterogeneous network environment in which small cells and a macrocell are mixed, a macro base station divides an entire frequency band that is allocated to a corresponding macrocell into a plurality of Frequency Partitions (FPs). The macro base station allocates some of the plurality of FPs to small cells that are included in the macrocell.

9 Claims, 8 Drawing Sheets

METHOD AND APPARATUS FOR ALLOCATING RESOURCE IN HETEROGENEOUS NETWORK

CROSS-REFERENCE TO RELATED APPLICATION

This application claims priority to and the benefit of Korean Patent Application No. 10-2014-0074529 filed in the Korean Intellectual Property Office on Jun. 18, 2014, the entire contents of which are incorporated herein by reference.

BACKGROUND OF THE INVENTION (a) Field of the Invention

The present invention relates to a method and apparatus for allocating an intercell resource in a heterogeneous network environment.

(b) Description of the Related Art

In a wideband wireless communication system, performance of terminals that are located at a cell edge is deteriorated by interference from adjacent cells. Particularly, in an Orthogonal Frequency Division Multiplexing (OFDM)-based wideband wireless communication system, because adjacent cells use the same frequency resource, performance of a terminal that is located at a cell boundary region is largely deteriorated by intercell interference. As a method for solving this problem, intercell interference is mitigated using a Fractional Frequency Reuse (FFR) technique.

As a future wideband wireless communication network, a heterogeneous network (HetNet) that is formed with a macrocell and a plurality of small cells has been in the spotlight. In the HetNet, a macro base station controls and manages a plurality of small cell base stations existing within the macrocell. That is, the macro base station controls a frequency and resource allocation of the small cell, thereby minimizing intercell interference.

In a HetNet environment, a method of allocating the same frequency to a macrocell and small cells and a method of allocating different frequencies to a macrocell and small cells exist. In the method of allocating different frequencies, intercell interference may be mitigated, but there is a problem that an additional frequency resource should be allocated for the small cells. However, in the method of allocating the same frequency, because interference between a macrocell and small cells or interference between small cells may increase, a method of reducing intercell interference is very important for increasing network quantity.

SUMMARY OF THE INVENTION

The present invention has been made in an effort to provide a method and apparatus for allocating a resource having advantages of being capable of increasing a network capacity while mitigating intercell interference when macrocells and small cells use the same frequency in a heterogeneous network environment in which a plurality of macrocells and small cells are mixed.

An exemplary embodiment of the present invention provides a method of allocating a resource in a network environment in which small cells and a macrocell are mixed, including: dividing, by a macro base station, an entire frequency band that is allocated to a corresponding macrocell into a plurality of Frequency Partitions (FPs); and allocating some of the plurality of FPs to small cells that are included in the macrocell.

The dividing of an entire frequency band may include dividing the entire frequency band into a plurality of FPs using a Fractional Frequency Reuse (FFR) technique.

The method may further include: broadcasting, by the macro base station, system information including preamble location information and an FP that is allocated to small cells; and receiving Channel Quality Indicator (CQI) information from terminals.

The method may further include at least one of: allocating, when CQI information that is collected from terminals does not include small cell information, a resource, and transmitting data to the terminal using all FPs including FPs that are allocated to the small cells; transmitting, when CQI information that is collected from the terminal includes only information about one small cell, data to the terminal through an FP that is allocated to the corresponding small cell; and allocating, when CQI information that is collected from the terminal is information about at least two small cells, a resource to the terminal, and transmitting data through cooperative communication between small cells corresponding to received small cell IDs.

The method may further include one of: transmitting, by the small cell, a preamble signal using a first symbol of a random subframe of an FP that is allocated thereto; and transmitting, by the small cell, a preamble signal using a first channel of a random subframe of an FP that is allocated thereto.

The method may further include: receiving, by the terminal, the preamble signal and extracting ID of a corresponding small cell from the received preamble signal; and measuring a channel quality and transmitting CQI information including a corresponding channel quality value and extracted small cell ID to the macro base station.

Another embodiment of the present invention provides an apparatus that allocates a resource in a network environment in which small cells and a macrocell are mixed, including: a resource division unit that divides an entire frequency band that is allocated to the macrocell into a plurality of Frequency Partitions (FPs) and that allocates some of the plurality of FPs to small cells that are included in the macrocell; a CQI information collection unit that receives Channel Quality Indicator (CQI) information from terminals; a first resource allocation unit that allocates a resource and transmits data to the terminal using all FPs including FPs that are allocated to small cells, when CQI information that is collected from terminals does not include small cell information; a second resource allocation unit that transmits data to the terminal through an FP that is allocated to a corresponding small cell, when CQI information that is collected from the terminal includes only information about one small cell; and a third resource allocation unit that allocates a resource to the terminal and transmits data through cooperative communication between small cells corresponding to received small cell IDs, when CQI information that is collected from the terminal is information about at least two small cells.

The resource division unit may divide the entire frequency band into a plurality of frequency partitions (FPs) using a Fractional Frequency Reuse (FFR) technique.

The resource allocation apparatus may further include a system information broadcasting unit that broadcasts system information including preamble location information and an FP that the macro base station allocates to small cells.

The small cell information may include a channel measuring value corresponding to small cell ID and channel quality.

DETAILED DESCRIPTION OF THE EMBODIMENTS

Figure 1:
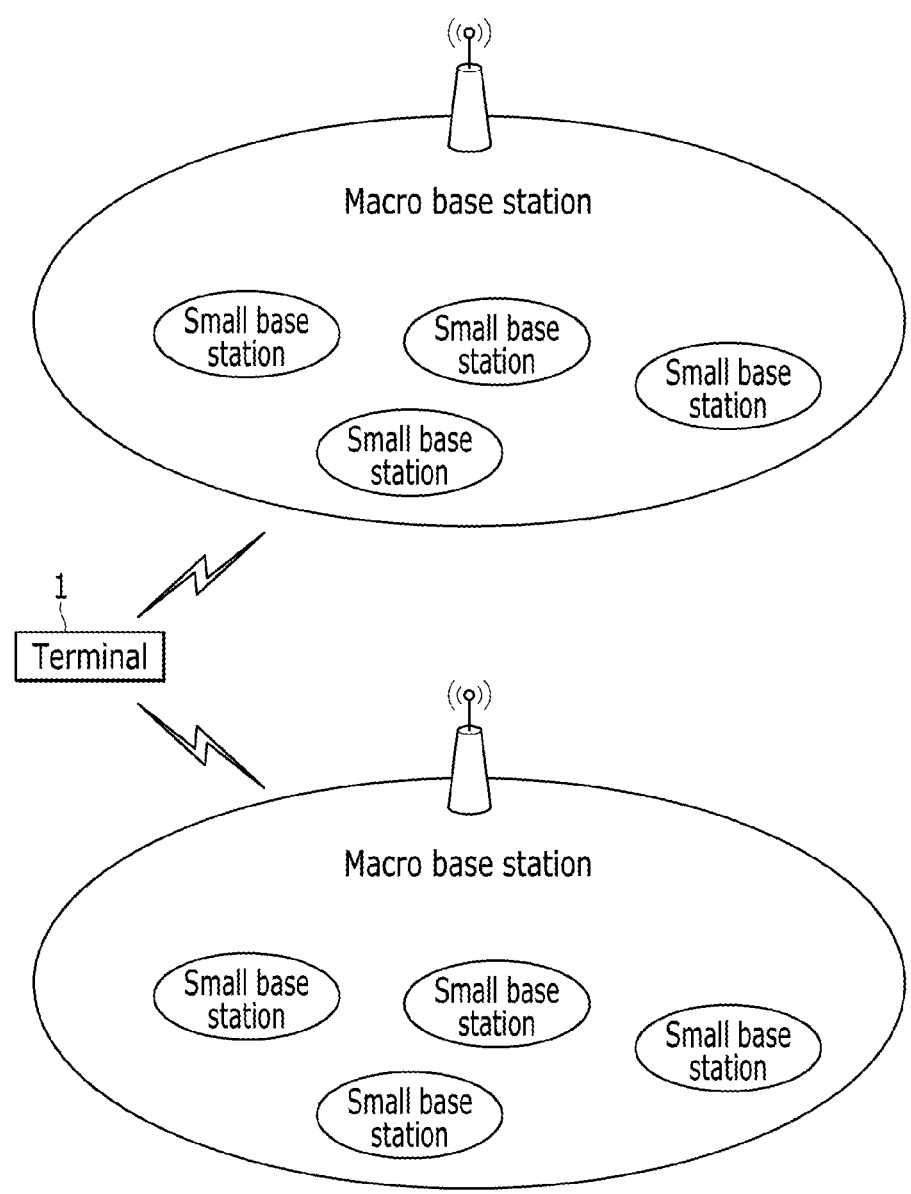
FIG. 1 is a diagram illustrating a network environment according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification and claims, unless explicitly described to the contrary, the word "comprise" and variations such as "comprises" or "comprising" will be understood to imply the inclusion of stated elements but not the exclusion of any other elements.

In the entire specification, a terminal may indicate a mobile terminal (MT), a mobile station (MS), an advanced mobile station (AMS), a high reliability mobile station (HR-MS), a subscriber station (SS), a portable subscriber station (PSS), an access terminal (AT), and user equipment (UE), and may include an entire function or a partial function of the MT, the MS, the AMS, the HR-MS, the SS, the PSS, the AT, and the UE.

Further, a base station (BS) may indicate an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) that performs a BS function, a relay node (RN) that performs a BS function, an advanced relay station (ARS) that performs a BS function, a high reliability relay station (HR-RS) that performs a BS function, and a small-sized BS [a femto BS, a home node B (HNB), a home eNodeB (HeNB), a pico BS, a metro BS, and a micro BS], and may include an entire function or a partial function of the ABS, the nodeB, the eNodeB, the AP, the RAS, the BTS, the MMR-BS, the RS, the RN, the ARS, the HR-RS, and the small-sized BS.

Hereinafter, a method and apparatus for allocating a resource according to an exemplary embodiment of the present invention will be described.

FIG. 1 is a diagram illustrating a network environment according to an exemplary embodiment of the present invention.

As shown in FIG. 1, in a network environment in which a plurality of small cells are mixed, a terminal 1 performs access to a corresponding cell through a base station that manages each cell.

In a network environment in which small cells and a macrocell are mixed, a macro base station within the macrocell communicates with small base stations that are located at each of a plurality of small cells existing in the macrocell thereof and controls a radio resource of the terminal 1.

In an exemplary embodiment of the present invention, part of an entire frequency band that is allocated to the macrocell is allocated to the small cell.

Figure 2:
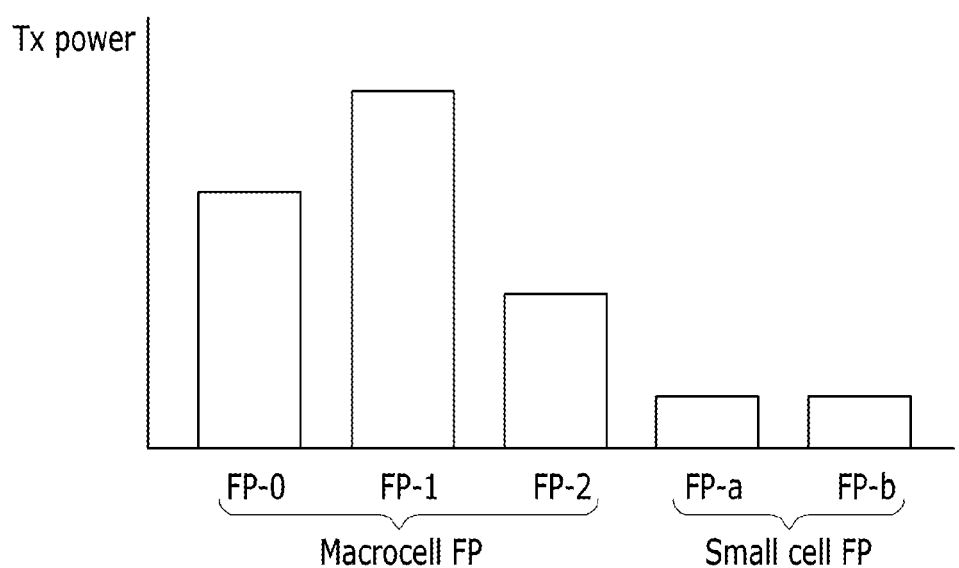
FIG. 2 is a diagram illustrating frequency band allocation according to an exemplary embodiment of the present invention.

FIG. 2 is a diagram illustrating frequency band allocation according to an exemplary embodiment of the present invention.

As shown in FIG. 2, an entire frequency band that is allocated to the macrocell is divided into a plurality of Frequency Partitions (FPs) using a Fractional Frequency Reuse (FFR) technique. A random FP of the plurality of FPs is allocated to the small cell. A bandwidth of an FP is allocated to the small cell in consideration of an amount of data that is serviced from the small cell. Further, transmission power is allocated to the small cell base station in consideration of a cell radius of the small cell. Such a small cell related FP bandwidth and transmission power are controlled by the macro base station.

Figure 3:
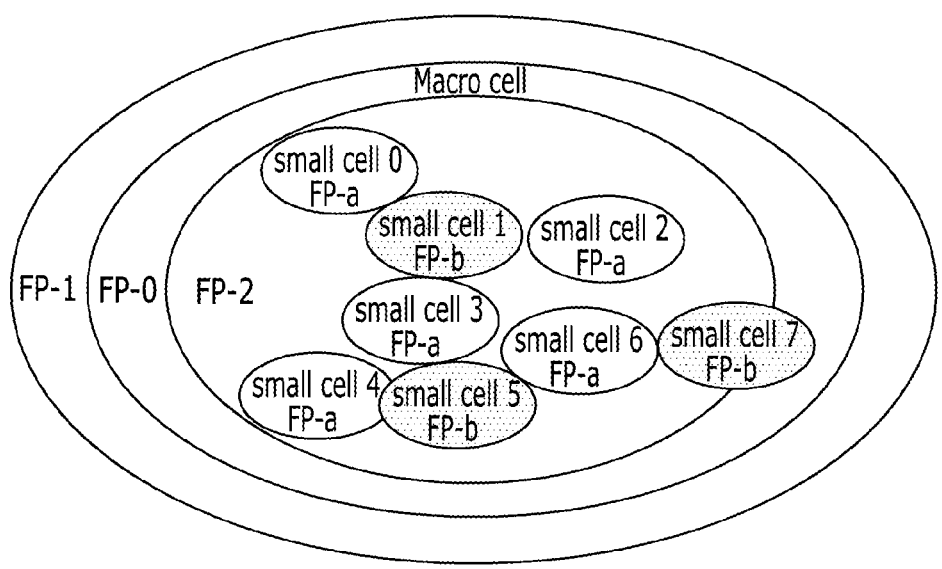
FIG. 3 is a diagram illustrating frequency band allocation according to an exemplary embodiment of the present invention.

FIG. 3 is a diagram illustrating frequency band allocation according to an exemplary embodiment of the present invention. Here, an example in which a plurality of small cells are disposed within the macrocell and in which a frequency band is allocated by the control of the macro base station is illustrated.

In a HetNet, in order to increase a network capacity, as shown in FIG. 3, a plurality of small cells are disposed within the macrocell, and the macro base station divides an entire frequency band into a plurality of FPs (e.g., FP_0, FP_1, FP_2, FP_a, and FP_b) and allocates some FPs (e.g., FP_a and FP_b) to small cells. The macro base station transmits a large amount of traffic using a high quality radio link through small cells.

In this way, in the HetNet that is formed with a macrocell and a plurality of small cells, the terminal moves within the macrocell, and may move from the macrocell to the small cell, from the small cell to the small cell, and from the small cell to the macrocell. In this case, when the terminal moves to a small cell area, it is necessary to identify a small cell area in which the terminal presently exists. The terminal detects identification (ID) of a small cell at which the terminal is located through a preamble signal that is transmitted from the small cell.

Figure 4:
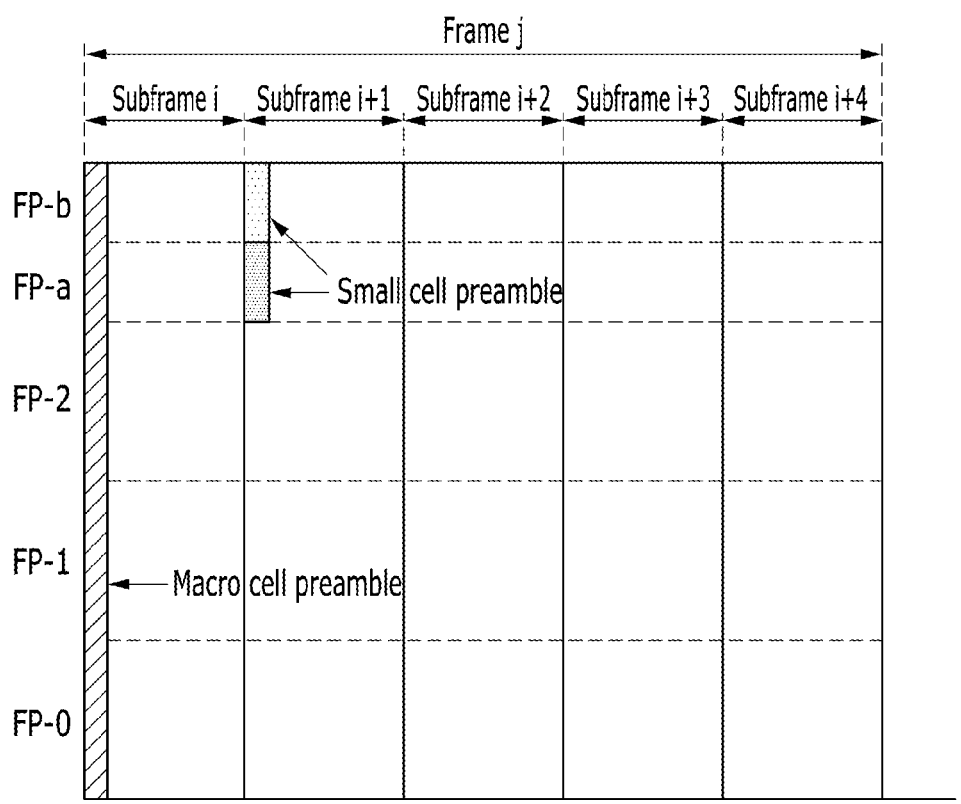
FIGS. 4 and 5 are diagrams illustrating preamble transmission according to an exemplary embodiment of the present invention.
Figure 5:
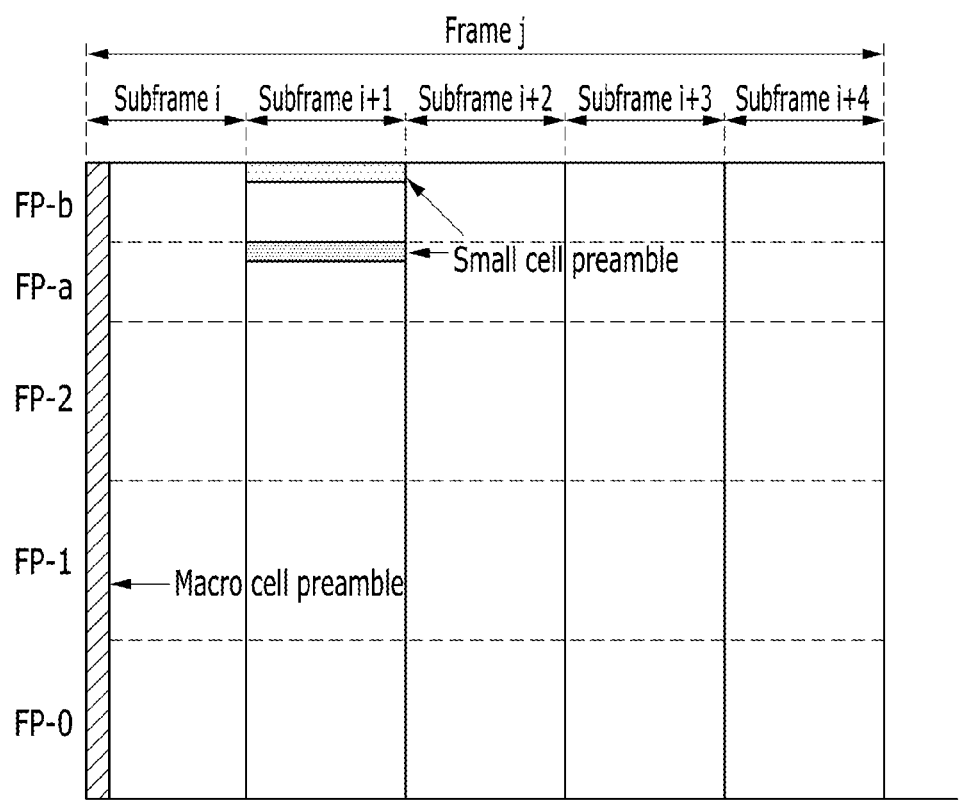

FIGS. 4 and 5 are diagrams illustrating preamble transmission according to an exemplary embodiment of the present invention.

As shown in FIG. 4, the small cell transmits a preamble signal using a first symbol of a random subframe of an FP that is allocated thereto. Alternatively, as shown in FIG. 5, the small cell transmits a preamble signal using a first channel of a random subframe of an FP that is allocated thereto.

The terminal searches for and receives the preamble signal that is transmitted from the small cell and detects ID of a small cell at which the terminal is located from the received preamble signal.

The terminal detects ID of the small cell, determines the small cell at which the terminal is located, and transmits and receives data to and from the corresponding small cell.

Figure 6:
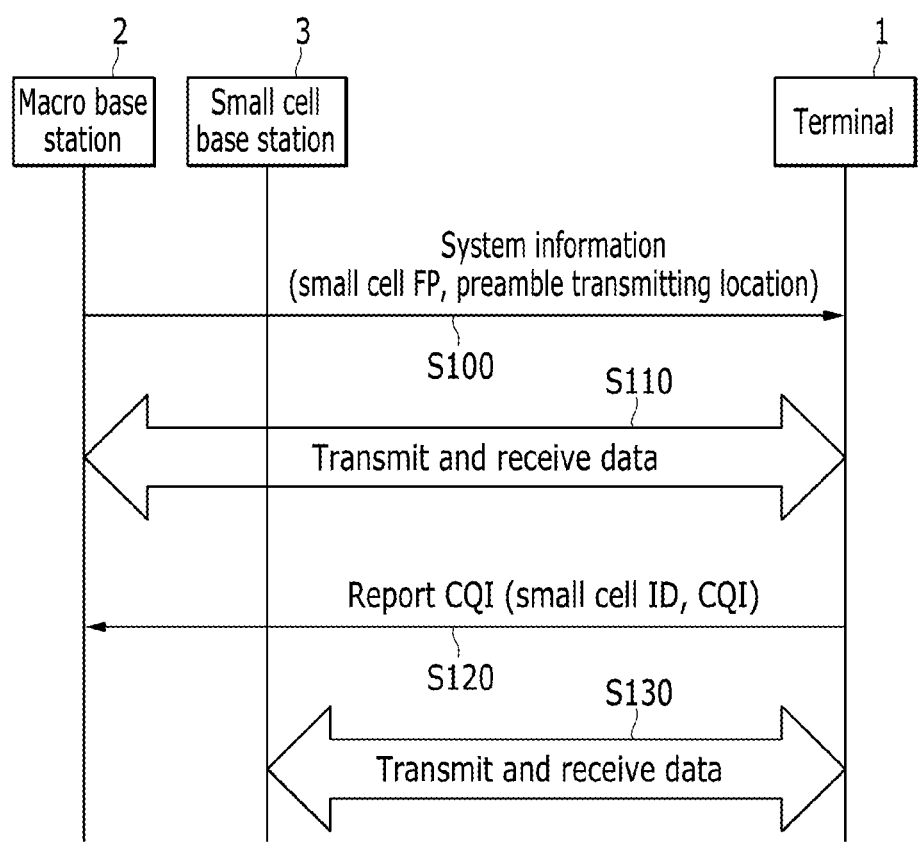
FIG. 6 is a flowchart illustrating a data transmitting and receiving process between a terminal and a base station according to an exemplary embodiment of the present invention.

FIG. 6 is a flowchart illustrating a data transmitting and receiving process between a terminal and a base station according to an exemplary embodiment of the present invention.

A macro base station 2 broadcasts system information to all terminals (S100). The broadcasted system information includes preamble location information and an FP that is allocated to the small cell.

The terminal 1, having received system information that is broadcasted from the macro base station, determines a preamble location and an FP that is allocated to the small cell from the received system information, and receives a preamble at a preamble transmission location of an FP that is allocated to the small cell.

When the terminal enters a small cell area, a preamble may be detected in the FP that is allocated to the small cell. That is, as shown in FIGS. 4 and 5, a preamble signal is transmitted using a first symbol of a random subframe of the FP that is allocated to the small cell or a preamble signal is transmitted using a first channel of a random subframe of the FP, and the terminal 1 receives such a preamble signal (S110). In such a case, the terminal 1 extracts cell ID from the received preamble signal and measures channel quality. The terminal 1 transmits Channel Quality Indicator (CQI) information including the extracted small cell ID and a channel quality measurement value to the macro base station 2 (S120).

The macro base station 2 transmits data to the terminal 1 through the small cell base station 3 based on the small cell ID and the channel quality measurement value that are included in a CQI that is transmitted from the terminal (S130).

In this way, in an exemplary embodiment of the present invention, the macro base station 2 divides an entire frequency band that is allocated to the macrocell into a plurality of FPs using FFR and allocates some FPs to the small cell. As described above, when the terminal receives a preamble from the FP for the small cell, extracts small cell ID, and transmits CQI information including the small cell ID to the macro base station 2, the macro base station 2 transmits data to the terminal 1 through the small cell base station based on the CQI information.

When the macrocell and the small cell use the same frequency, in order to increase network capacity while mitigating intercell interference, the macro base station 2 allocates a resource to the terminal 1.

Figure 7:
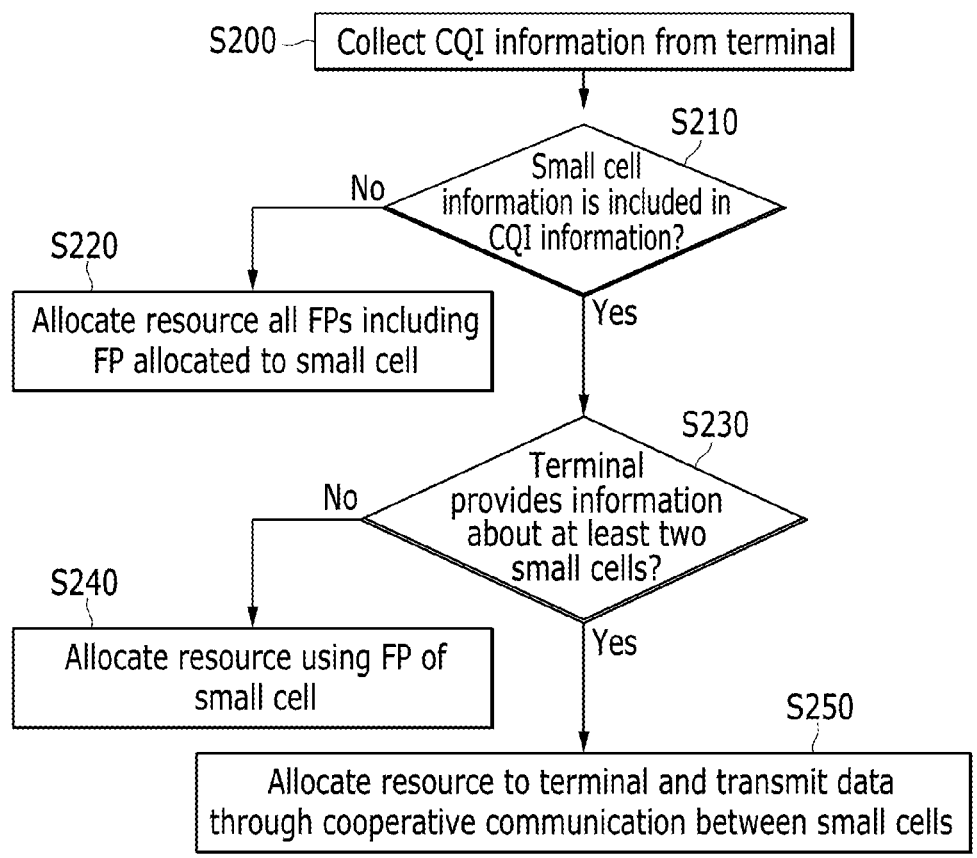
FIG. 7 is a flowchart illustrating a method of allocating a resource according to an exemplary embodiment of the present invention.

FIG. 7 is a flowchart illustrating a method of allocating a resource according to an exemplary embodiment of the present invention.

The macro base station 2 periodically collects CQI information from the terminal 1 (S200).

The macro base station 2 determines whether small cell information is included in the CQI information that is received from the terminal 1 (S210), and if small cell information is not included in the CQI information that is received from the terminal 1, the macro base station 2 transmits and receives data to and from the terminal 1 using an FP for the macrocell. Here, small cell information includes small cell ID and a channel quality measurement value.

If small cell information does not exist in the CQI information that is collected from all terminals within the macrocell, the macro base station 2 may transmit small data to the terminal using an FP that is allocated to the small cell, i.e., an FP for the small cell. That is, the macro base station 2 allocates a resource and transmits data to the terminal 1 using all FPs including an FP that is allocated to the small cell (S220).

If small cell information exists in the CQI information that is collected from all terminals, the macro base station 2 determines whether the terminal 1 provides information about at least two small cells (S230). If small cell information that is collected from the terminal includes one small cell ID instead of information about at least two small cells, the macro base station 2 transmits data to the terminal through a corresponding small cell (S240). That is, the macro base station allocates a resource and transmits data to the terminal 1 using an FP that is allocated to the small cell corresponding to a small cell ID that is collected from the terminal.

If small cell information that is collected from the terminal is information about at least two small cells, the macro base station 2 transmits data to the terminal 1 through cooperative communication between a plurality of small cells. That is, the macro base station 2 allocates a resource to the terminal 1 and transmits data through cooperative communication between small cells corresponding to received small cell IDs (S250).

A resource allocation apparatus for such resource allocation is described as follows.

Figure 8:
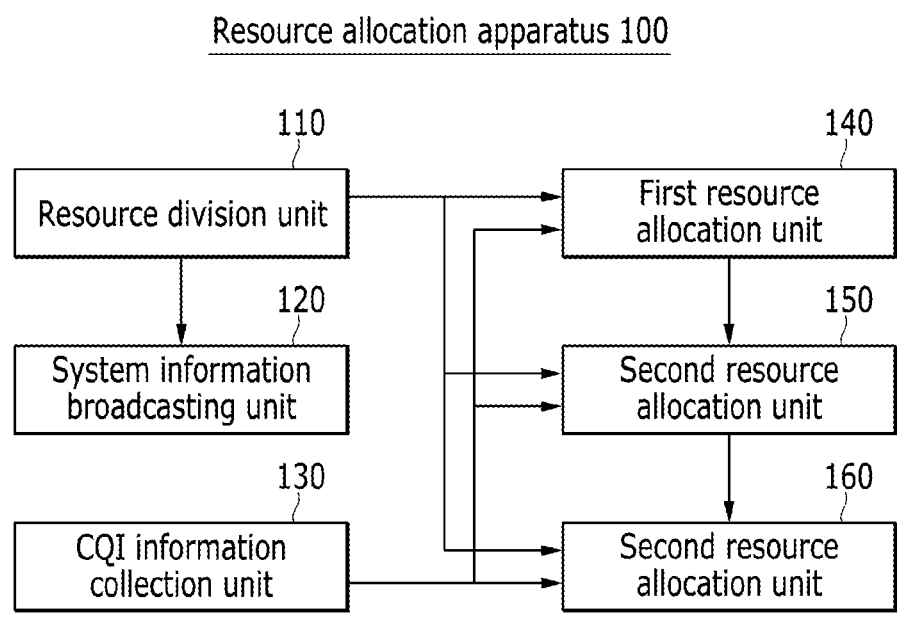
FIG. 8 is a block diagram illustrating a structure of a resource allocation apparatus according to an exemplary embodiment of the present invention.

FIG. 8 is a block diagram illustrating a structure of a resource allocation apparatus according to an exemplary embodiment of the present invention.

As shown in FIG. 8, a resource allocation apparatus 100 according to an exemplary embodiment of the present invention includes a resource division unit 110, a system information broadcasting unit 120, a CQI information collection unit 130, and first to third resource allocation units 140, 150, and 160.

The resource division unit 110 divides an entire frequency band that is allocated to a corresponding macrocell into a plurality of FPs using FFR and allocates some FPs to managing small cells. For example, as shown in FIGS. 2 and 3, the entire frequency band that is allocated to the macrocell is divided into, for example, FP_0, FP_1, FP_2, FP_a, and FP_b, and FP_a and FP_b are allocated to managing small cells. For example, as shown in FIG. 3, when eight small cells of small cell 0-small cell 7 exist within the macrocell, a first FP FP_a is allocated to a small cell 0, a small cell 2, a small cell 3, a small cell 4, and a small cell 6, and a second FP FP_b is allocated to a small cell 1, a small cell 5, and a small cell 7.

The resource division unit 110 may allocate a bandwidth of an FP to the small cell in consideration of a serviced data amount and allocate transmission power to the small cell base station in consideration of a cell radius of the small cell.

The system information broadcasting unit 120 broadcasts system information including preamble location information and an FP that is allocated to small cells.

The CQI information collection unit 130 receives CQI information from terminals, and the CQI information includes small cell information of a channel quality measurement value and small cell ID.

When CQI information that is collected from the terminal does not include small cell information, the first resource allocation unit 140 allocates a resource to the terminal and transmits and receives data. That is, when small cell information does not exist in the CQI information that is collected from all terminals, the first resource allocation unit 140 allocates a resource and transmits data to the terminal using all FPs including an FP that is allocated to the small cell.

When CQI information that is collected from the terminal includes only information about one small cell, the second resource allocation unit 150 transmits data to the terminal through an FP that is allocated to the corresponding small cell.

When CQI information that is collected from the terminal is information about at least two small cells, the third resource allocation unit 160 allocates a resource to the terminal and transmits data through cooperative communication between small cells corresponding to received small cell IDs.

According to an exemplary embodiment of the present invention, in a heterogeneous network environment that is formed with a macrocell and a plurality of small cells, by allocating a random band of an entire frequency band that is allocated to the macrocell to a separate frequency band for the small cell and by controlling such frequency bands in a macro base station, network capacity can be increased.

An exemplary embodiment of the present invention may not only be embodied through the above-described apparatus and/or method, but may also be embodied through a program that executes a function corresponding to a configuration of the exemplary embodiment of the present invention or through a recording medium on which the program is recorded, and can be easily embodied by a person of ordinary skill in the art from a description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of allocating a resource in a network environment in which small cells and a macrocell are mixed, the method comprising:
   dividing, by a macro base station, an entire frequency band that is allocated to a corresponding macrocell into a plurality of Frequency Partitions (FPs);
   allocating some of the plurality of FPs to small cells that are included in the macrocell;
   broadcasting, by the macro base station, system information comprising preamble location information and an FP that is allocated to small cells;
   receiving, by the macrocell from one or more terminals in the network environment, Channel Quality Indicator (CQI) information of one or more small cells, the CQI information generated based on receiving the preamble in signals generated by the one or more small cells; and
   determining whether the CQI information collected from the one or more terminals includes small cell information, and performing at least one of:
      allocating, when CQI information that is collected from the one or more terminals does not include small cell information, a resource, and transmitting data to the one or more terminals using all FPs including FPs that are allocated to the small cells;
      transmitting, when CQI information that is collected from the one or more terminals includes only information about one small cell, data to the one or more terminals through an FP that is allocated to the corresponding small cell; and
      allocating, when CQI information that is collected from the one or more terminals is information about at least two small cells, a resource to the one or more terminals, and transmitting data through cooperative communication between small cells corresponding to received small cell IDs.

2. The method of claim 1, wherein the dividing of an entire frequency band comprises dividing the entire frequency band into a plurality of FPs using a Fractional Frequency Reuse (FFR) technique.

3. The method of claim 1, further comprising one of:
   transmitting, by the small cell, a preamble signal using a first symbol of a random subframe of an FP that is allocated thereto; and
   transmitting, by the small cell, a preamble signal using a first channel of a random subframe of an FP that is allocated thereto.

4. The method of claim 3, further comprising:
   receiving, by the one or more terminals, the preamble signal and extracting ID of a corresponding small cell from the received preamble signal; and
   measuring a channel quality and transmitting CQI information comprising a corresponding channel quality value and extracted small cell ID to the macro base station.

5. The method of claim 1, wherein the broadcasting the system information includes broadcasting in each FP, a macro cell preamble including information corresponding to the macrocell, and, further broadcasting, in each FP allocated to a small cell, a small cell preamble including information corresponding to the small cell.

6. An apparatus that allocates a resource in a network environment in which small cells and a macrocell are mixed, the apparatus comprising:
   a resource division unit that divides an entire frequency band that is allocated to the macrocell into a plurality of Frequency Partitions (FPs) and that allocates some of the plurality of FPs to small cells that are included in the macrocell;
   a CQI information collection unit that receives Channel Quality Indicator (CQI) information from one or more terminals;
   a first resource allocation unit that allocates a resource and transmits data to the one or more terminal using all FPs comprising FPs that are allocated to small cells, when CQI information that is collected from one or more terminals does not include small cell information;
   a second resource allocation unit that transmits data to the one or more terminals through an FP that is allocated to a corresponding small cell, when CQI information that is collected from the one or more terminals comprises only information about one small cell; and
   a third resource allocation unit that allocates a resource to the one or more terminals and transmits data through cooperative communication between small cells corresponding to received small cell IDs, when CQI information that is collected from the one or more terminals is information about at least two small cells.

7. The apparatus of claim 6, wherein the resource division unit divides the entire frequency band into a plurality of FPs using a Fractional Frequency Reuse (FFR) technique.

8. The apparatus of claim 6, further comprising a system information broadcasting unit that broadcasts system information comprising preamble location information and an FP that the macro base station allocates to small cells.

9. The apparatus of claim 6, wherein the small cell information comprises a channel measuring value corresponding to small cell ID and channel quality.

\* \* \* \* \*